United States Patent
Bayle

[11] 3,889,511
[45] June 17, 1975

[54] METHOD OF MAKING A CONTROLLED TORQUE CONNECTING MEMBER

[75] Inventor: Robert Vincent Bayle, Ecquevilly, France

[73] Assignee: Gemmer-France, France

[22] Filed: Mar. 2, 1973

[21] Appl. No.: 337,721

[30] Foreign Application Priority Data
Mar. 15, 1972 France .................. 72.09039

[52] U.S. Cl. .............. 72/370; 29/175; 72/402; 403/118
[51] Int. Cl. ............................. B21k 21/08
[58] Field of Search .......... 72/402, 398, 370, 401; 29/175 R, 517; 403/118

[56] References Cited
UNITED STATES PATENTS

| 687,464 | 11/1901 | Sullivan | 72/398 |
| 1,617,890 | 2/1927 | Abbey | 72/402 |
| 2,363,050 | 11/1944 | Dewey | 29/175 R |
| 2,864,159 | 12/1958 | Doering | 72/402 |
| 3,239,930 | 3/1966 | Violleau | 72/370 |
| 3,289,451 | 12/1966 | Koch | 72/370 |
| 3,496,800 | 2/1970 | Brezinski | 29/175 R |
| 3,503,246 | 3/1970 | Shiokawa | 72/401 |
| 3,566,651 | 3/1971 | Tlaker | 72/370 |
| 3,570,297 | 3/1971 | Matthews | 72/370 |
| 3,792,603 | 2/1974 | Orain | 72/402 |

Primary Examiner—C. W. Lanham
Assistant Examiner—Gene P. Crosby
Attorney, Agent, or Firm—Hill, Gross, Simpson, Van Santen, Steadman, Chiara & Simpson

[57] ABSTRACT

A connector in the form of a metal tubular member is made by compressing circumferentially spaced radial segments around the tube on a mandrel while forming external longitudinal folds between the segments. The mandrel may be a smooth cylindrical rod and the tube is internally threaded after the mandrel is withdrawn or the mandrel may be threaded and the tube threads formed on the segments engaging the mandrel. The folds also provide grips for a wrench to rotate the tube. The connecting member is useful in turnbuckles, steering linkages, and the like and avoids the necessity for lock nuts, clamps and the like heretofore required to prevent a loosening of threaded parts.

9 Claims, 8 Drawing Figures

PATENTED JUN 17 1975  3,889,511

SHEET 1

3,889,511

METHOD OF MAKING A CONTROLLED TORQUE CONNECTING MEMBER

BACKGROUND OF THE INVENTION

1. Field of the Invention

This invention relates to the art of connecting rotatable parts with a controlled torque resistance to rotation and specifically deals with a method of making a tubular connecting member having longitudinal folds adapted to be spread by an oversize member in the tube and to a method of making the tube.

2. Description of the Prior Art

Heretofore, lock nuts, split tube and clamp assemblies, and the like were required for controlling torque resistance to relative rotation of threaded parts such as turnbuckles, rod and tube linkages, and the like. In automotive steering linkages where the stem ends of tie rod joints have been threaded into tie rods, it is conventional to split the ends of the tie rod and to surround the split end of the tie rod with a clamp and draw-bolt assembly effective to contract the tie rod tightly around the threaded stem thereby preventing unauthorized rotation of the joint relative to the tie rod.

SUMMARY OF THE INVENTION

The present invention now eliminates the requirement for lock nuts, clamps, and other devices for controlling torque resistance to rotation of threaded together parts. According to the present invention an internally threaded tubular part is provided with longitudinally extending folds which can spread to accommodate insertion of an oversized threaded member in the tube. The thus stressed expanded tube will exert a clamping action on the inserted member proportional to the expansion of the tube through the bending of the folds. A controlled torque resistance to relative rotation is thereby obtained.

The tubular connecting member is made according to this invention by radially contracting at least a portion of the tube around a mandrel with circumferentially spaced pressing jaws permitting the formation of the longitudinal folds between the jaws as the diameter of the tube is reduced. The inserted mandrel may be a plain rod and the contracted portion of the tube may thereafter be internally threaded to receive the oversized threaded member which will expand the contracted tube portion to provide the controlled torque resistance to rotation. Alternately, the mandrel may be externally threaded so that the tube threads are formed during the jaw pressing operation.

In a preferred embodiment, the tube receives one or two spacer sleeves in an end thereof. These sleeves support the mandrel centrally of the portion of the tube which is to be contracted. A multiple jaw, preferably a four-jaw press or vise is then contracted around this portion of the tube to reduce it or neck it down into engagement around the mandrel. Portions of the tube between the jaws of the press are raised up in external folds to accommodate the reduction in diameter of the tube. The number of folds will depend on the number of jaws in the press. A four-jaw press will thus produce four external longitudinal folds and these folds are preferably in equally spaced, circumferential relation. It should be understood, however, that less than or more than four-folds could be formed with a preferred minimum of three folds.

It is then an object of this invention to provide a method of making a threaded connection member which has controlled torque resistance to rotation of an inserted member without the aid of lock nuts, clamps, and the like.

Another object of the invention is to make an internally threaded tubular member with longitudinal folds accommodating radial expansion of the member by an inserted member to control torque resistance to rotation between the members.

Another object of the invention is to provide a method of making tubular connecting members with longitudinal folds.

A further object of this invention is to provide a method of contracting at least a portion of a tubular member forming folds along the length of the contracted portion accommodating expansion of that portion.

A specific object of the invention is to provide a method of jaw pressing a tubular member to form an expansible tubular portion.

Another specific object of the invention is to provide a method of jaw pressing a portion of a tube around a threaded mandrel to form an expansible internally threaded connection member having folds along the length thereof.

Other and further objects of this invention will become apparent to those skilled in this art from the following detailed description of the annexed sheets of drawings which by way of examples illustrate two embodiments of the invention.

BRIEF DESCRIPTION OF THE ILLUSTRATED EMBODIMENTS

Figure 1:
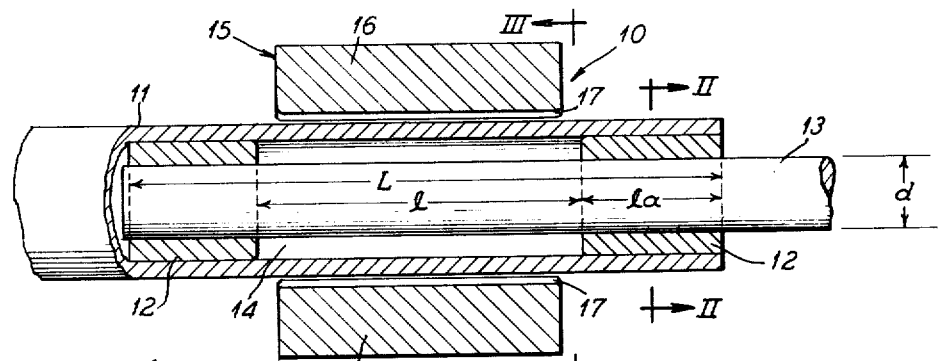
FIG. 1 is a longitudinal sectional view of a tube assembly for producing the connection members according to the method of this invention.
Figure 2:
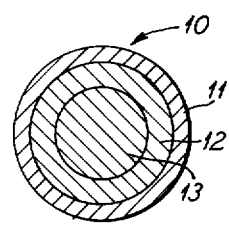
FIG. 2 is a transverse sectional view along the line II—II of FIG. 1.
Figure 3:
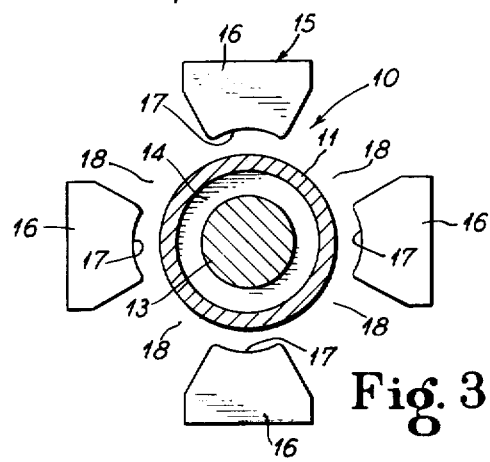
FIG. 3 is a transverse sectional view along the line III—III of FIG. 1.

In FIGS. 1 to 5, the reference numeral 10 designates generally an assembly for producing tubular connection members made according to this invention. As shown, the assembly 10 includes a metal tube 11 having an end portion to be contracted, shown in cross section. One metal spacer sleeve 12 is inserted in the open end of this tube 11 and a second metal sleeve 12 is preferably spaced inwardly in the tube from the first sleeve 12. A metal mandrel, in the form of a rod 13 extends through the open end of the tube supported on the sleeves 12 in concentric relation with the tube. The tube is cylindrical and can have any desired length. An annular gap or space 14 is provided between the mandrel 13 and the tube 11 bounded axially by the spacer sleeves 12. A jaw press or chuck 15 surrounds the portion of the tube between the sleeves 12 and in the illustrated embodiment has four jaws 16 in spaced circumferential relation. Each jaw 16 has a concave face 17 for embracing a portion of the tube opposite the jaw. The jaw segments 16 have an axial dimension less than the axial length of the gap or space 14 and a circumferential dimension less than the circumference of the tube so that gaps 18 are provided between the jaws 16. These gaps, of course, will decrease in width as the jaws are contracted around the tube but gaps of reduced width will remain after full contraction of the jaws.

Figure 4:
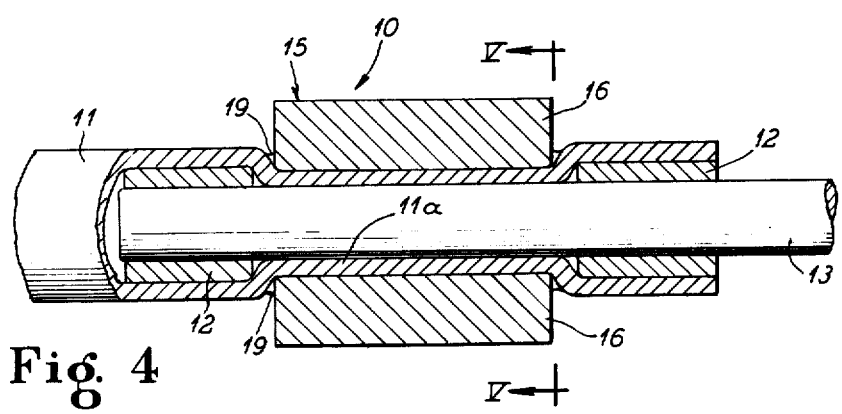
FIG. 4 is a view similar to FIG. 1 but illustrating the positions of the parts at the completion of the pressing operation.
Figure 5:
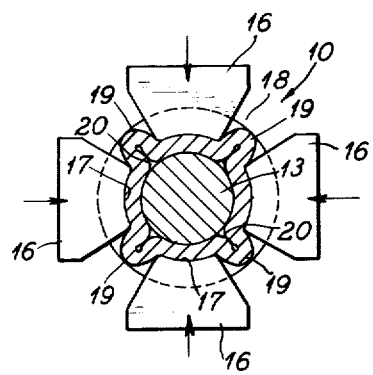
FIG. 5 is a transverse cross sectional view along the line V—V of FIG. 4.

The jaws 16 are pressed against the tube toward the mandrel 13 and are effective to reduce the diameter of the tube as shown in FIG. 4 for forming an intermediate tubular portion 11a tightly embracing the mandrel 13. The inner periphery of the reduced tubular portion 11a will be controlled by the size and shape of the mandrel 13. In order to accommodate the reduction in diameter of the tube to form the portion 11a, the metal of the tube will fold up in the gaps 18 between the jaws 16 and longitudinal folds 19 will be formed. The number of folds 19 will depend upon the number of jaws 16. As shown in FIG. 5, four equally spaced folds 19 are provided between the four jaws 16 of the chuck or press. As shown in FIG. 5, each fold 19 is closed with the inner faces of the opposite sides thereof contacting each other outwardly from a narrow longitudinal groove 20 along the length of the fold.

The mandrel 13 has a diameter $d$ of any desired size smaller than the internal diameter of the tube 11 and preferably only slightly smaller. The mandrel is inserted along a length $l$ in the tube and the effective length $l$ of the mandrel lies between the sleeves 12. As shown in FIG. 1, it is preferred that a portion having a length designated at $l_a$ of the original diameter of the tube will remain at the end of the tube. It is therefore apparent that the length L of the mandrel 13 penetrating the tube 11 must at least be equal to but preferably greater than the total lengths $l$ and $l_a$.

While two sleeves 12 have been illustrated to concentrically support the mandrel 13 in the tube 11, it should be understood that one sleeve 12 in the outboard end of the tube 11 could be used in an assembly where the mandrel is rigidly supported or that any other arrangement could be used for maintaining coaxial relationship between the mandrel and the tube. Spacer sleeves could be omitted entirely relying on the centering of the tube relative to the mandrel by the concave seating faces of the jaws 16.

Following the pressing operation the jaws 16 are retracted, the mandrel 13 is removed from the tube and any spacer sleeves are also removed. Next, the reduced diameter portion 11a of the tube is internally threaded by means of a threading tap or the like.

Figure 6:
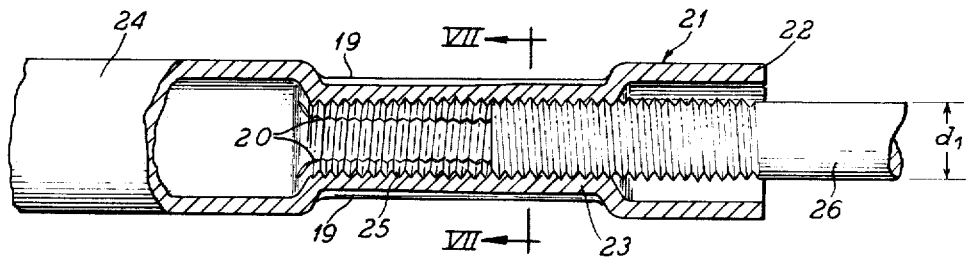
FIG. 6 is a longitudinal sectional view of a finished tubular connection member made by the method of this invention and illustrating the manner in which it is expanded by an inserted threaded male member.
Figure 7:
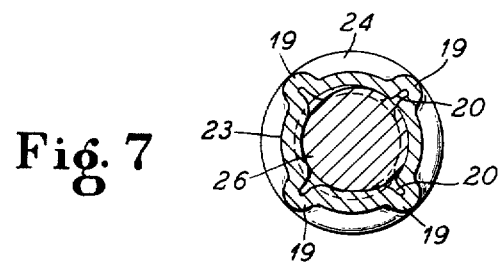
FIG. 7 is a transverse cross sectional view along the line VII—VII of FIG. 6.

As shown in FIGS. 6 and 7, the finished connector 21 of this invention is a tube having an enlarged end portion 22, a reduced diameter resilient portion 23 and an enlarged main length or body portion 24. The reduced diameter portion 23 is internally threaded at 25 and has the four longitudinal folds 19 along the length thereof with the slots 20 extending along the length of the threaded portion 23.

A threaded member 26 to be connected to the member 21 has a diameter $d_1$ greater than the diameter of the reduced portion 23 and substantially less than the inner diameter of the end portion 22 so that when the member is inserted in the connector 21, it will fit freely through the end 22 and when threaded on the threads 24, it will expand the folds 19 opening up the grooves 20 and stressing the reduced portion 23. Thus, the threads on the member 26 will be tightly gripped by the threads 24 and relative rotation between the parts 21 and 26 will be resisted in proportion to the degree of stressing of the folds 19. In this manner, a controlled torque resistance to relative rotation of the parts 21 and 26 can be effected depending upon the degree of stressing of the folds 19 which, of course, is controlled by the amount of oversize of the member 26 relative to the reduced resilient portion 23 of the connector.

The external folds 19 also serve another function in providing abutment grips for a wrench to rotate the connector 21 on the threaded member 26.

Figure 8:
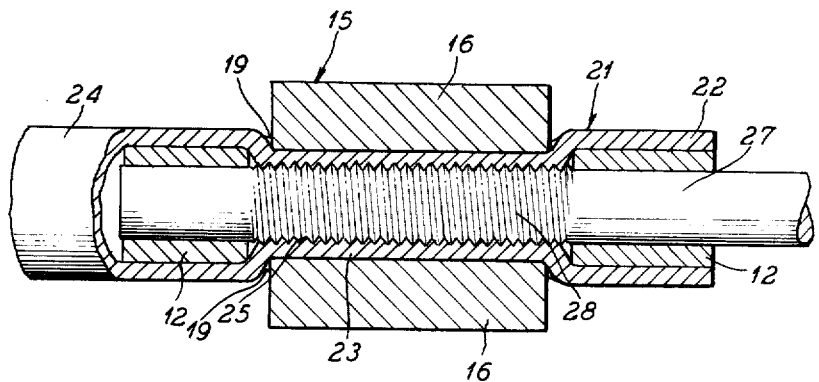
FIG. 8 is a view similar to FIG. 4 but illustrating the simultaneous forming of internal threads in the tubular member.

Instead of forming the threads 24 and the reduced portion 23 of the connector 21 by a tapping operation following removal of the mandrel 13, as shown in FIG. 8, this mandrel can be replaced with a mandrel 27 having an externally threaded portion 28 along the length of the portion of the tube to be collapsed. Then, when the jaws 16 contract the tube to form the reduced portion 23, the threads 28 on the mandrel will be embedded in the inner peripheral wall of the reduced portion 23 to form threaded impressions therein except along those portions that lie opposite the grooves 20. Then, the jaw press 15 is rotated to rotate the tube around the mandrel and this, of course, cuts the threads into those unthreaded portions. The mandrel is then unthreaded from the connection unit and the jaws are retracted to release the finished unit 21.

From the above descriptions it will be clear that this invention now provides a method of making a connection device which will afford controlled torque resistance to rotation of a member therein, thus avoiding the use of heretofore required lock nuts, clamps and the like.

I claim as my invention:

1. The method of making a connection member for controlled torque assembly with an inserted member which comprises inserting a mandrel in a tube of greater diameter than the mandrel, concentrically spacing the tube around the mandrel, radially contracting at least a portion of the length of the tube into the space between the the tube and mandrel to engage the tube substantially continuously around the mandrel, simultaneously raising circumferentially spaced outturned radial closed folds of tube material along the length of the contracting portion, shaping the interior of the contracted portion into conformity with the outer periphery of the mandrel, and withdrawing the mandrel.

2. The method of claim 1, including the step of supporting the mandrel in concentric spaced relation from the tube on a sleeve inserted in the end of the tube.

3. The method of claim 1, including the step of tapping threads in the contracted portion of the tube after the mandrel is withdrawn from the tube.

4. The method of claim 1, including the step of providing threads on the mandrel and embedding the contracted portion of the tube in said threads to form complementary threads in said portion.

5. The method of claim 4, including the step of rotating the tube on the threaded mandrel to complete thread formation along the longitudinal folds.

6. The method of making a tubular connector for threaded engagement with an inserted member which comprises contracting a portion of the length of a metal tube around a mandrel into mated engagement therewith around substantially the entire periphery thereof, simultaneously raising radially outturned closed longitudinal folds along the length of the tube being contracted, continuing the contraction of the tube until the inner surfaces of the folds engage each other and forming a substantially continuous internal thread in the contracted portion of the tube interrupted only at narrow grooves where the closed folds merge into the contracted portion of the tube.

7. The method of claim 6, including the step of supporting the mandrel in the tube on a sleeve inserted in an end of the tube.

8. The method of making a connection member which comprises surrounding a metal tube with a plurality of circumferentially spaced jaws having concave inner faces shaped to mate with the tube, inserting a mandrel in the tube of smaller diameter than the tube, spacing the tube concentrically around the mandrel, radially contracting the jaws against the tube to reduce the tube in diameter into tight engagement with the mandrel around the entire periphery of the mandrel, simultaneously raising outturned closed folds along the length of the tube between the circumferentially spaced jaws, removing the mandrel from the tube, and releasing the jaws from the tube.

9. The method of claim 8, including the step of spacing the jaws in equal circumferential spaced relation around the tube.

* * * * *